United States Patent [19]

Edmaier

[11] 4,120,271
[45] Oct. 17, 1978

[54] VENTILATING ARRANGEMENT FOR AN ENGINE COMPARTMENT

[75] Inventor: Franz Edmaier, Markdorf, Fed. Rep. of Germany

[73] Assignee: Motoren- und Turbinen-Union Friedrichshafen GmbH, Fed. Rep. of Germany

[21] Appl. No.: 721,753

[22] Filed: Sep. 9, 1976

[30] Foreign Application Priority Data

Sep. 9, 1975 [DE] Fed. Rep. of Germany ....... 2540040

[51] Int. Cl.² ............ F01P 11/10; F28F 9/22
[52] U.S. Cl. ............ 123/41.49; 123/41.57; 165/51; 165/125; 165/126
[58] Field of Search ........ 123/41.3, 41.31, 41.48, 123/41.49, 41.57; 165/51, 125, 126

[56] References Cited

U.S. PATENT DOCUMENTS

| 1,904,407 | 4/1933 | Cappa | 165/51 |
| 2,260,594 | 10/1941 | Young | 165/125 |
| 2,703,075 | 3/1955 | Sanders | 123/41.49 |
| 3,552,483 | 1/1971 | North | 123/41.49 |
| 3,777,808 | 12/1973 | Izumi | 165/51 |
| 3,788,418 | 1/1974 | Clancy et al. | 165/51 |
| 3,858,644 | 1/1975 | Beck et al. | 123/41.49 |

FOREIGN PATENT DOCUMENTS

| 2,050,265 | 4/1972 | Fed. Rep. of Germany | 123/41.57 |
| 1,282,136 | 7/1972 | United Kingdom | 123/41.57 |
| 877,557 | 9/1961 | United Kingdom | 165/51 |

Primary Examiner—Charles J. Myhre
Assistant Examiner—Sheldon Richter
Attorney, Agent, or Firm—Craig & Antonelli

[57] ABSTRACT

Ventilating and cooling arrangement for an engine compartment of a liquid-cooled internal combustion engine of the type having a radiator for recooling the engine coolant by means of ambient air. A ring radiator is provided which is housed in an air conducting housing which is separate from the engine compartment. The air conducting housing is configured to form two radiator exhaust air chambers at respective different peripheral circumferential positions along the radiator. A first of the exhaust air chambers communicates a portion of the exhaust air from the radiator directly to the engine compartment as engine compartment cooling and ventilation air. The other of the exhaust air chambers communicates the remaining portion of the exhaust air directly from the radiator to the surrounding atmosphere in bypassing relationship to the engine compartment. Air outlets from the second-mentioned exhaust air chamber are disposed above the air outlets from the engine compartment to improve ventilation flow characteristics in the engine compartment.

5 Claims, 2 Drawing Figures

VENTILATING ARRANGEMENT FOR AN ENGINE COMPARTMENT

BACKGROUND AND SUMMARY OF THE INVENTION

This invention relates to a ventilating arrangement for an engine compartment of a liquid-cooled internal combustion engine wherein the coolant of the internal combustion engine is recooled by means of ambient air in a radiator arranged in an air-conducting housing separated from the engine compartment; and wherein a partial amount of the cooling air conveyed by the cooling air fan is passed through the engine compartment for ventilation and cooling purposes.

In conventional ventilating arrangements, "cold" cooling air is branched off between the cooling air fan and the radiator and fed to the engine compartment. This branched-off quantity of cooling air is for the recooling of the engine coolant. As a consequence, disadvantages are encountered in two respects in the conventional ventilating arrangements:

(a) The cooling air fan must be designed for an air throughput which is larger by the amount of the branched-off cooling air (about 5-10% of the air throughput) than would be required for the amount of heat to be removed by the radiator. This means a higher power requirement for the cooling air fan and a larger structural size of the cooling unit.

(b) Although the ventilation of the engine compartment is effected with "cold" cooling air, the efficiency is unsatisfactory, because the amount of cooling air branched off for the ventilation of the engine compartment must be dimensioned to be relatively minor, considering the cooling of the internal combustion engine, and thus a uniform ventilation throughout the engine compartment is not attained. Thereby, so-called hot spots are formed in the engine compartment on insufficiently ventilated locations, with an increased air temperature.

It is, therefore, an object of this invention to provide a ventilating arrangement which does not exhibit the above-described disadvantages. This object is attained by providing that the ventilation and cooling are effected by means of radiator exhaust air; that a conventional, so-called ring radiator is utilized as the radiator; that a subdivision of the air-conducting housing into two waste air chambers is achieved by the shape of the sidewalls of the air-conducting housing when the ring radiator has been installed, different peripheral zones of the ring radiator being associated with these waste air chambers; and that one of the waste air chambers is in communication with the engine compartment via at least one opening, whereas the other waste air chamber is in direct communication with the surroundings via an air outlet.

These measures make it possible to limit the amount conveyed by the fan to the cooling air throughput required for engine cooling. Yet, a sufficiently large quantity of cooling air is available for the engine compartment. Although in this case the engine compartment is ventilated with "warm" waste air of the ring radiator, thanks to the larger air throughput as compared to known systems a more uniform ventilation throughout and an improved cooling of the engine compartment are attained.

Especially advantageous relationships with respect to the width of the air-conducting housing and the air throughput in the engine compartment result by associating, according to this invention, approximately one-third to one-half of the ring radiator periphery with the waste air chamber in communication with the engine compartment.

In this arrangement, a ratio of the width of the air outlet to the diameter of the ring radiator is obtained which is about 1.1, whereas in the other case, i.e., when the entire amount of waste air of the ring radiator must flow off toward one side, the ratio is about 1.4.

In accordance with this invention, the air outlet for the engine compartment waste air is disposed below the air outlet for the radiator air, to attain an intensive flow of the air through the entire engine compartment.

The advantages attained by means of the present invention reside particularly in that a small structural width of the air-conducting housing is obtained, because the partial amount of the ring radiator waste air passing into the engine compartment need not be conducted in the air-conducting housing around the ring radiator to the air outlet; that this improved conductance of the waste air ensues in a uniform load on all ring radiator peripheral zones; and that thereby, with the same power input into the fan, a higher cooling efficiency results for the recooling of the coolant of the internal combustion engine.

These and further objects, features and advantages of the present invention will become more obvious from the following description when taken in connection with the accompanying drawings which show, for purposes of illustration only, a single embodiment in accordance with the present invention.

DETAILED DESCRIPTION OF THE DRAWINGS

Figure 1:
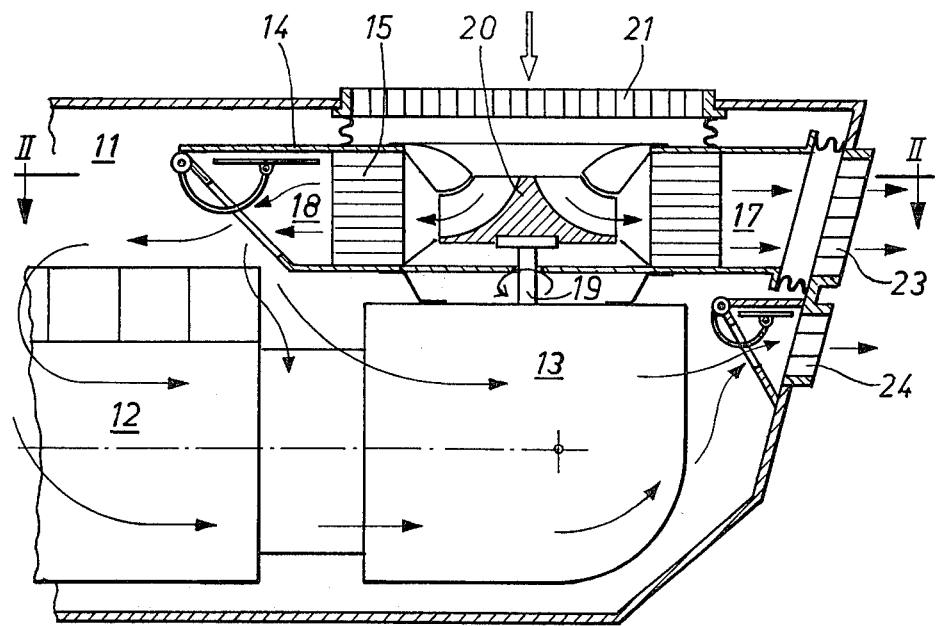
FIG. 1 is a schematic sectional view of the ventilating arrangement of the present invention, taken along line I — I of FIG. 2.
Figure 2:
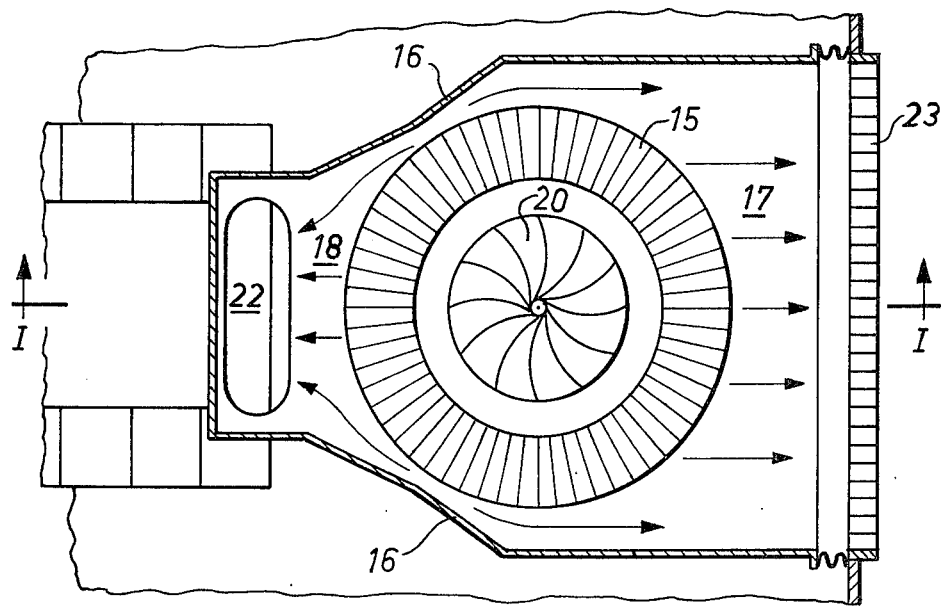
FIG. 2 is a schematic sectional view of the ventilating arrangement of the present invention, taken along line II - II of FIG. 1.

A ring radiator 15 is arranged, within an air-conducting housing 14. Housing 14 is subdivided in engine compartment 11 of, for example, a crawler-type vehicle with a drive unit consisting of an internal combustion engine 12 and a gear system (transmission) 13. The ring radiator 15 serves for recooling the coolant of the internal combustion engine 12 by means of ambient air.

Cooling air fan 20, driven by the gear system 13 by way of a shaft 19, takes in air from the surroundings via an inlet 21. The conveyed air flows through the ring radiator 15 in the radial direction (solid headed arrows) and passes into the air-conducting housing 14. Sidewalls 16 of the air-conducting housing 14 are shaped so that, when the ring radiator 15 has been installed, the air-conducting housing 14 is subdivided into two waste air chambers 17 and 18. Differently large peripheral zones of the ring radiator 15 are associated with the two waste air chambers 17, 18. One waste air chamber 18 is in communication with the engine compartment 11 via an opening 22, whereas the other waste air chamber 17 is in communication with the surroundings via an air outlet 23. The ring radiator waste air which has passed via opening 22 into the engine compartment 11 passes through the latter and exits via an air outlet 24 for the engine compartment waste air, this outlet being arranged below the air outlet 23 for the ring radiator waste air, into the surrounding atmosphere.

An especially compact arrangement results according to particularly preferred embodiments of the invention with approximately one-third to one-half of the ring radiator periphery associated with the waste air chamber 18 in communication with the engine compartment 11. The width of the air-conducting housing required for the conductance of the air with very little throttling then becomes a minimum, because the partial amount of ring radiator waste air flowing into the engine compartment 11 need not be conducted around the ring radiator.

While I have shown and described one embodiment in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

What is claimed is:

1. Ventilating and cooling arrangement for an engine compartment of a liquid-cooled internal combustion engine of the type having a radiator for recooling the engine coolant by means of ambient air; said arrangement comprising:

ambient air moving means for drawing air through said radiator, and an air conducting housing separate from the engine compartment and surrounding the radiator, wherein said air conducting housing is configured to form two radiator exhaust air chambers at respective different positions adjacent said radiator, one of said radiator exhaust air chambers communicating a first portion of the exhaust air from said radiator to the engine compartment as engine compartment cooling and ventilation air, the other of said radiator exhaust air chambers communicating a second portion of the exhaust air from said radiator to the surrounding atmosphere in bypassing relationship to said engine compartment, wherein said radiator is a ring radiator having a central inlet for said ambient air and radially extending outlets for said air disposed around the circumference thereof, and wherein said ambient air moving means is a fan disposed in the central portion of said radiator, and wherein between one-third (1/3) and one-half (1/2) of the ring radiator periphery opens into said radiator exhaust air chamber communicating with the engine compartment.

2. Ventilating and cooling arrangement for an engine compartment of a liquid-cooled internal combustion engine of the type having a radiator for recooling the engine coolant by means of ambient air; said arrangement comprising:

ambient air moving means for drawing air through said radiator, and an air conducting housing separate from the engine compartment and surrounding the radiator, wherein said air conducting housing is configured to form two radiator exhaust air chambers at respective different positions adjacent said radiator, one of said radiator exhaust air chambers communicating a first portion of the exhaust air from said radiator to the engine compartment as engine compartment cooling and ventilation air, the other of said radiator exhaust air chambers communicating a second portion of the exhaust air from said radiator to the surrounding atmosphere in bypassing relationship to said engine compartment, and wherein a first air outlet is provided for exhausting air to the surroundings from said other of said radiator exhaust air chambers, wherein a second air outlet is provided for exhausting air to the surroundings from said one of said radiator exhaust air chambers, and wherein said first air outlet is disposed vertically above said second air outlet to thereby optimize ventilating flow through the engine compartment.

3. An arrangement according to claim 2, wherein said radiator is a ring radiator having a central inlet for said ambient air and radially extending outlets for said air disposed around the circumference thereof, and wherein said ambient air moving means is a fan disposed in the central portion of said radiator.

4. An arrangement according to claim 3, wherein an engine and an engine driven gear system are arranged in said engine compartment, wherein said fan is driven by a shaft driven by said gear system, and wherein said radiator, fan and air conducting housing are disposed above said engine and gear system in said engine compartment.

5. An arrangement according to claim 4, wherein said first and second outlets are disposed adjacent the extreme end of said air conducting housing, which extreme end is at the opposite diametric side of said radiator as is said radiator exhaust air chamber which opens directly to said engine compartment.

* * * * *